US008113901B1

(12) United States Patent
Yeh et al.

(10) Patent No.: US 8,113,901 B1
(45) Date of Patent: Feb. 14, 2012

(54) MANUFACTURING METHOD OF 3D DISPLAY DEVICE AND GRATING DEVICE THEREOF

(75) Inventors: Yu-Chou Yeh, Taoyuan County (TW); Chao-Yi Wang, Taoyuan County (TW); Wen-Chih Lo, Taoyuan County (TW); Chi-Hsien Sung, Taoyuan County (TW); Tsung-Her Yeh, Taipei County (TW)

(73) Assignee: J Touch Corporation, Taoyuan County (TW)

( * ) Notice: Subject to any disclaimer, the term of this patent is extended or adjusted under 35 U.S.C. 154(b) by 0 days.

(21) Appl. No.: 13/101,385

(22) Filed: May 5, 2011

(30) Foreign Application Priority Data

Mar. 4, 2011 (TW) .................................. 100107330

(51) Int. Cl.
*H01J 9/00* (2006.01)
(52) U.S. Cl. ........................................................ 445/24
(58) Field of Classification Search ................ 445/23–25
See application file for complete search history.

(56) References Cited

FOREIGN PATENT DOCUMENTS
TW 368088 M 11/2009
TW 371902 M 1/2010

*Primary Examiner* — Joseph L Williams
(74) *Attorney, Agent, or Firm* — Rosenberg, Klein & Lee (57) ABSTRACT

A manufacturing method of a 3D display device and a grating device provides a photopolymerization polymer solution, an electrochromic solution and at least one transparent conductive substrate are provided; mixes a specific quantity X of the photopolymerization polymer solution with a specific quantity Y of the electrochromic solution to produce a grating manufacturing solution; places the grating manufacturing solution between two transparent conductive substrates or at a side of a transparent conductive substrate; projects light through a photomask onto the grating manufacturing solution which is cured to form a transparent fence-shaped isolating element, and a portion of the grating manufacturing solution remains at a fluid state. The devices are manufactured in a primary manufacturing step to improve the manufacturing efficiency. The transparent conductive substrate is placed on a display device and electrically coupled to an electrode portion to complete the production of the grating device of the 3D display device.

38 Claims, 11 Drawing Sheets

MANUFACTURING METHOD OF 3D DISPLAY DEVICE AND GRATING DEVICE THEREOF

CROSS-REFERENCE TO RELATED APPLICATIONS

This non-provisional application claims priority under 35 U.S.C. §119(a) on Patent Application No(s). 100107330 filed in Taiwan, R.O.C. on Mar. 4, 2011, the entire contents of which are hereby incorporated by reference.

BACKGROUND OF THE INVENTION

1. Field of the Invention

The present invention relates to the field of display devices, and more particularly to a manufacturing method of a 3D display device and a grating device thereof.

2. Description of the Prior Art

The principle of present well-known 3D image display technologies adopts a binocular disparity for receiving different images from both left and right eyes of a viewer respectively, and finally the viewer's brain combines the images into a 3D image. In naked-eye 3D display technologies, there are three main types of structures, respectively: barrier, lenticular lens, and directional backlight, and the three structures have pros and cons. The lenticular lens is composed of a plurality of slender rectangular convex lenses arranged continuously along an optical axis, and the principle of light refraction is used for generating different left-eye and right-eye images, which are called a grating structure. Compared with the barrier structure that uses the light refraction to achieve the effect of dividing the light, the effect of less loss and higher brightness can be achieved. However, the refraction occurred at the edges of the lens structure is limited to result in a poor refraction, or the manufacturing discrepancy of the lenticular lens has a non-uniform lens surface to result in the production of stray lights and blurred 3D images and affect the overall 3D display effect. In addition, the barrier structure uses a whole row of barriers to limit the exit of light at a certain angle, such that the images at certain specific angles will be transmitted to the viewer's left and right eyes to generate the 3D image. Compared with the lenticular lens, the single-lens image is clearer, but the structural characteristics may reduce the overall brightness and resolution of the image.

As disclosed in R.O.C.(TW) Pat. No. M371902 entitled "Display device for switching 2D image/3D image display screen", the display device includes a flat panel display and a parallax barrier panel installed on a display surface of the flat panel display, wherein the parallax barrier panel with a grid pattern includes a first electrochromic material layer and a second electrochromic material layer. At a 2D image display mode, the grid pattern, the first electrochromic material layer and the second electrochromic material layer are transparent; and at a 3D image display mode, the grid pattern is an opaque pattern, and the first electrochromic material layer has a first color, and the second electrochromic material layer has a second color. As disclosed in R.O.C.(TW) Pat. No. M368088 entitled "Integrated electrochromic 2D/3D display device", a structure with a parallax barrier unit embedded into an LCD substrate comprises: a first substrate; a parallax barrier unit, disposed under the first substrate; a color filter unit, disposed under the parallax barrier unit; a common electrode, disposed under the color filter unit; a liquid crystal unit, disposed under the common electrode; a plurality of thin film transistors, disposed under the liquid crystal unit; a second substrate, disposed under the plurality of thin film transistors; and a light source, disposed under the second substrate; wherein the parallax barrier unit modulates the display of 2D images and 3D images and reduces the thickness and assembling cost of the conventional display device. Although the thickness of the LCD for displaying 3D images can be reduced since a transparent conductive layer and an electrochromic layer are disposed in a fence-shaped groove of an insulative transparent material, yet the actual manufacturing process of the grid patterned parallax barrier unit becomes relatively complicated.

In the aforementioned patents, an electrochromic material is used, and electrochromism (EC) refers to the phenomenon that light is absorbed or scattered by an electrochromic material under the effect of a current or an electric field to result in a reversible color change caused by redox reactions. However, the electrochromic devices of the aforementioned patents lack a necessary electrolyte layer required by electrochromic devices, since ions are not supplied to the electrolyte layer of the electrochromic layer, and the electrochromic device cannot produce a reversible oxidation or reduction to complete the change of coloration or decoloration or the coloration/decoloration speed is very slow. In addition, the transparent electrode layer and electrochromic material layer of the parallax barrier device are grid patterned, and whose manufacturing process requires a precise alignment for coating, spluttering or etching each laminated layer, and thus the manufacturing process is very complicated and the manufacturing efficiency is low.

Furthermore, the aforementioned patents adopt the conventional solid-state electrochromic material with the disadvantages of a low coloration/decoloration speed and a large driving voltage. For a quick speed and a small driving voltage, a liquid-state solution type electrochromic material should be used instead. However, the liquid-state solution type electrochromic material is not like the solid-state electrochromic material with a fence-shaped structure plated onto a conductive substrate surface, and thus it is necessary to form a barrier grating on the conductive substrate in order to fill the solution type electrochromic material. When the solution type electrochromic material changes its color, the blocked position is situated at a light transmitting status, and a manufacturing method of a 3D display device and a grating device thereof in accordance with the present invention can manufacture the barrier grating and package the solution type electrochromic material into the device within a primary manufacturing process, so as to simplify the manufacturing process and improve the manufacturing efficiency substantially.

SUMMARY OF THE INVENTION

In view of the aforementioned needs, the inventor of the present invention based on years of experience in the related industry to conduct extensive researches and experiments, and finally designed a novel manufacturing method of a 3D display device and a grating device thereof to meet the needs.

Therefore, it is a primary objective of the present invention to provide a manufacturing method of a 3D display device and a grating device thereof, so as to simplify the manufacturing procedure and improve the manufacturing efficiency significantly.

To meet the foregoing objective, the present invention provides a manufacturing method of a 3D display device and a grating device thereof, primarily illustrated by the following two embodiments:

In the first preferred embodiment, a photopolymerization polymer solution, a electrochromic material, a first transparent conductive substrate and a second transparent conductive substrate are provided; a specific quantity X of a photopolymerized polymer solution is mixed with a specific quantity Y of an electrochromic solution to produce a grating manufacturing solution; the grating manufacturing solution is packaged between the first transparent conductive substrate and the second transparent conductive substrate; a light is projected through a photomask to the grating manufacturing solution, such that the grating manufacturing solution projected by the light is polymerized and cured to form a transparent fence-shaped isolating element, and the grating manufacturing solution masked by the photomask remains its original fluid state, so as to form a grating device; and the grating device is installed on a side of a display device, and the first and second transparent conductive substrates are electrically coupled to an electrode portion, such that after an electric power is passed through, bright and dark grating effects occur between the grating manufacturing solution and the isolating element to form a grating device of a 3D display device.

In the second preferred embodiment, a photopolymerization polymer solution, an electrochromic solution, a transparent conductive substrate and a transparent conductive substrate with a flange at its edge; a specific quantity X of the photopolymerization polymer solution is mixed with a specific quantity Y of the electrochromic solution to produce a grating manufacturing solution; the grating manufacturing solution is placed on a side of the transparent conductive substrate having a flange; a light is projected through a photomask to the grating manufacturing solution, such that the grating manufacturing solution projected by the light is polymerized and cured to form a transparent fence-shaped isolating element, and the grating manufacturing solution masked by the photomask remains its original fluid state; the second transparent conductive substrate is placed on a side of the fence-shaped isolating element to form a grating device; and the grating device is installed on a side of a display device, and the first and second transparent conductive substrates are electrically coupled to an electrode portion, such that after an electric power is passed through, bright and dark grating effects occur between the grating manufacturing solution and the isolating element to form a grating device of a 3D display device.

In the foregoing preferred embodiments, the photopolymerization polymer solution adopted by the present invention is one selected from the collection of a free-radical polymerization type and an ionic polymerization type, wherein the photopolymerization polymer solution of the free-radical polymerization type is one selected from the collection of acrylate and unsaturated polyester; and the photopolymerization polymer solution of the ionic polymerization type is an epoxy resin. Preferably, NOA-65 is used as the photopolymerization polymer solution.

In the foregoing preferred embodiment, the electrochromic solution adopted in the present invention is made by mixing and dissolving an inorganic electrochromic material and an organic electrochromic material into a solvent, wherein the inorganic electrochromic material is an inorganic derivative selected from the collection of an oxide, a sulfide, a chloride and a hydroxide of a transition element, and the transition element is one selected from the collection of a scandium subgroup (IIIB), a vanadium subgroup (VB), a titanium subgroup (IVB), a chromium subgroup (VIB), a manganese subgroup (VIIB), an iron series (VIII), a copper subgroup (IB), a zinc subgroup (IIB), and a platinum series (VIIIB). The inorganic electrochromic material is an inorganic derivative selected from the collection of an oxide, a sulfide, a chloride, and a hydroxide of a halogen group (VIIA), an oxygen group (VIA), a nitrogen group (VA), a carbon group (IVA), a boron group (IIIA), an alkaline earth metal group (IIA), and an alkaline metal group (IA). The inorganic electrochromic material is one selected from the collection of ferrous chloride ($FeCl_2$), ferric trichloride ($FeCl_3$), titanium trichloride ($TiCl_3$), titanium tetrachloride ($TiCl_4$), bismuth chloride ($BiCl_3$), copper chloride ($CuCl_2$) and lithium bromide (LiBr). The organic electrochromic material is one selected from the collection of a redox indicator, a pH indicator and an organic compound, and the redox indicator is one selected from the collection of methylene blue ($C_{16}H_{18}ClN_3S.3H_2O$), methyl viologen, N-phenyl-o-anthranilic acid ($C_{13}H_{11}NO_2$), sodium diphenylamine sulfonate ($C_{12}H_{10}NNaO_3S$), dichloroindophenol sodium ($C_{12}H_6C_{12}NNaO_2$), and N—N'-diphenylbenzidine ($C_{20}H_{20}N_2$). The pH indicator is variamine blue B diazonium salt ($C_{13}H_{12}ClN_3O$). The organic compound is one selected from the collection of 7,7,8,8-tetracyanoquinodimethane and ferrocene [$Fe(C_5H_5)_2$]. The solvent is one selected from the collection of dimethyl sulfoxide [$(CH_3)_2SO$], propylene carbonate ($C_4H_6O_3$), water ($H_2O$), γ-butyrolactone, acetonitrile, propionitrile, benzonitrile, glutaronitrile, methylglutaronitrile, 3,3'-oxy-2-propionitrile, hydroxyl propionitrile, dimethyl-formamide, N-methylpyrrolidone, sulfon, 3-methyl sulfone and their mixtures. The electrochromic solution further includes at least one inert conductive salt selected from the collection of a lithium salt, a sodium salt, and a tetraalkylammonium salt.

In the foregoing preferred embodiments, the grating manufacturing solution of the present invention is further mixed with a dilute solution, wherein the dilute solution is an alcohol.

Another objective of the present invention is to apply the foregoing grating device to manufacture a 3D display device, such that the grating device is combined to a side of a display device to produce a 3D display effect.

To achieve the foregoing objectives, the present invention provides a grating device of the 3D display device manufactured in accordance to the foregoing preferred embodiment, and the grating device is installed at a side of a display device, and the first transparent conductive substrate and the second transparent conductive substrate are electrically and separately coupled to an electrode portion, such that after an electric power is passed through, bright and dark grating effects can be achieve between the structure with a composition of the grating manufacturing solution containing the electrochromic solution and the fence-shaped isolating element to provide the 3D display effect. By the manufacturing method of the 3D display device and the grating device thereof in accordance with the present invention, the manufacturing process can be simplified significantly to expedite the manufacturing process, so as to improve the manufacturing efficiency substantially.

DETAILED DESCRIPTION OF THE PREFERRED EMBODIMENTS

To make it easier for our examiner to understand the technical contents of the present invention, preferred embodiments together with related drawings are used for the detailed description of the present invention as follows.

Figure 1:
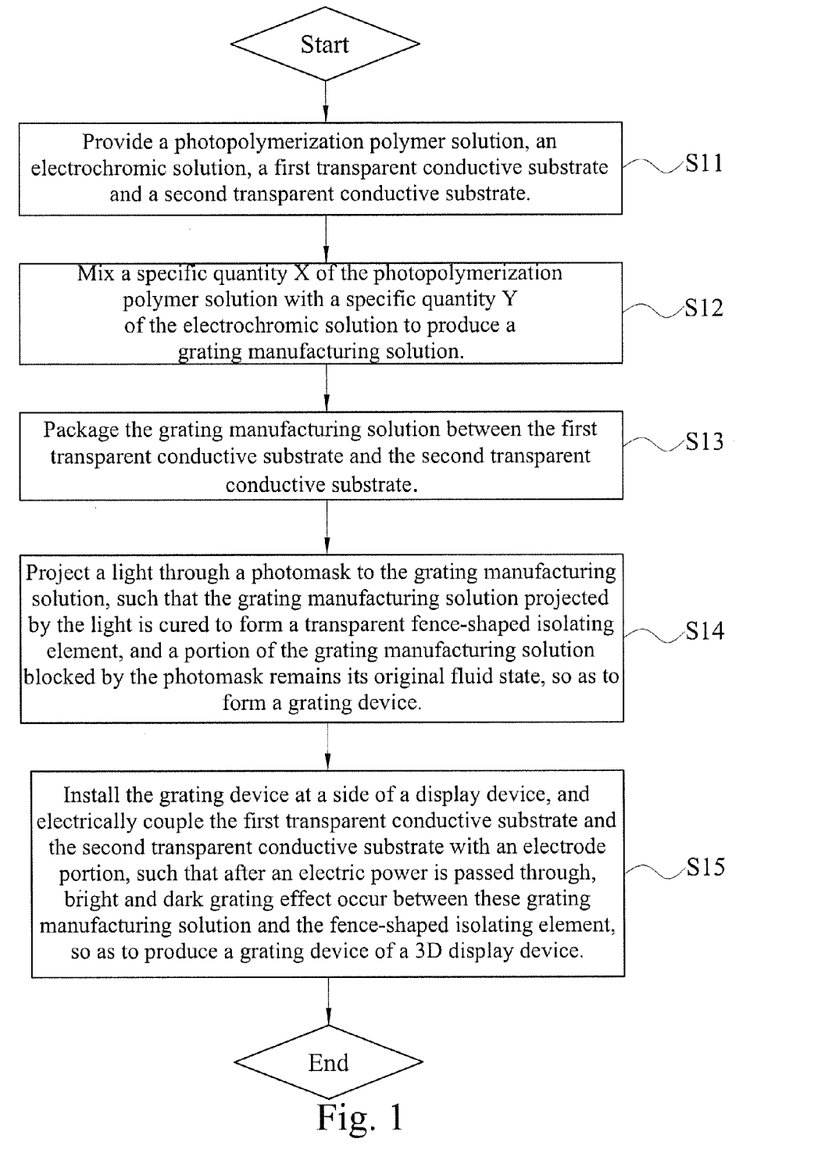
FIG. 1 is a manufacturing flow chart of a first preferred embodiment of the present invention.
Figure 2:
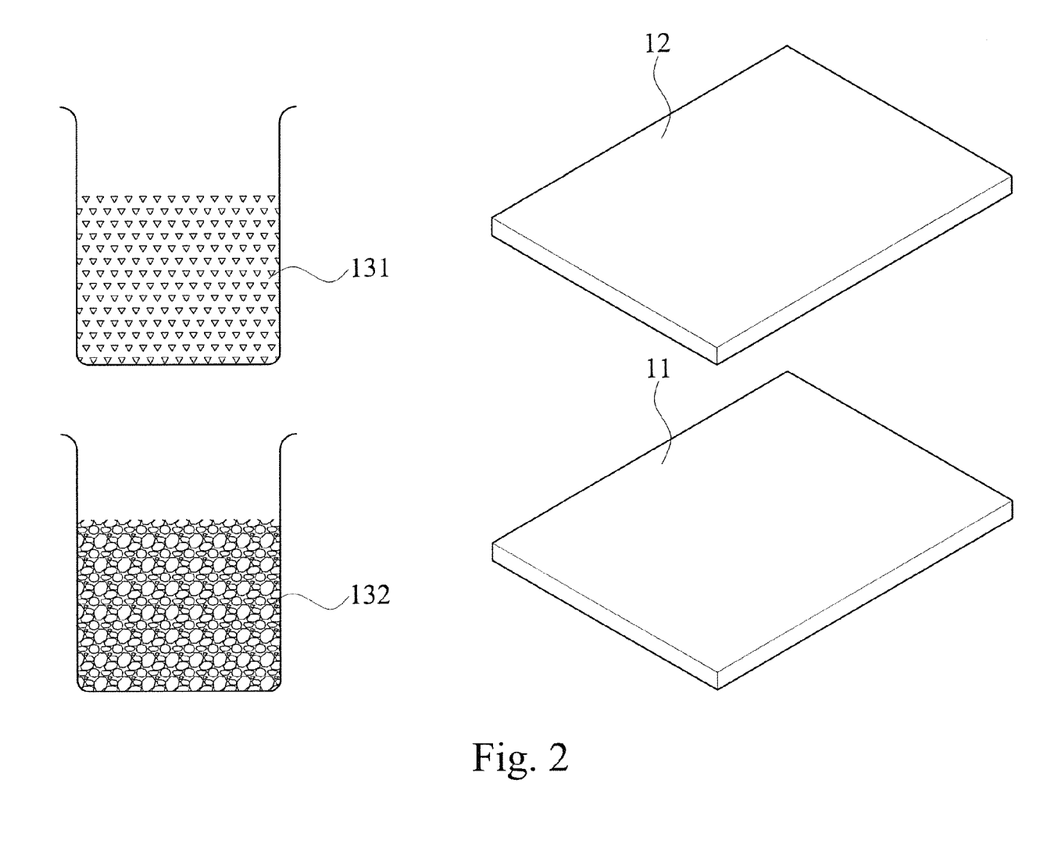
FIG. 2 is a first schematic view of the manufacturing flow in accordance with a first preferred embodiment of the present invention.
Figure 3:
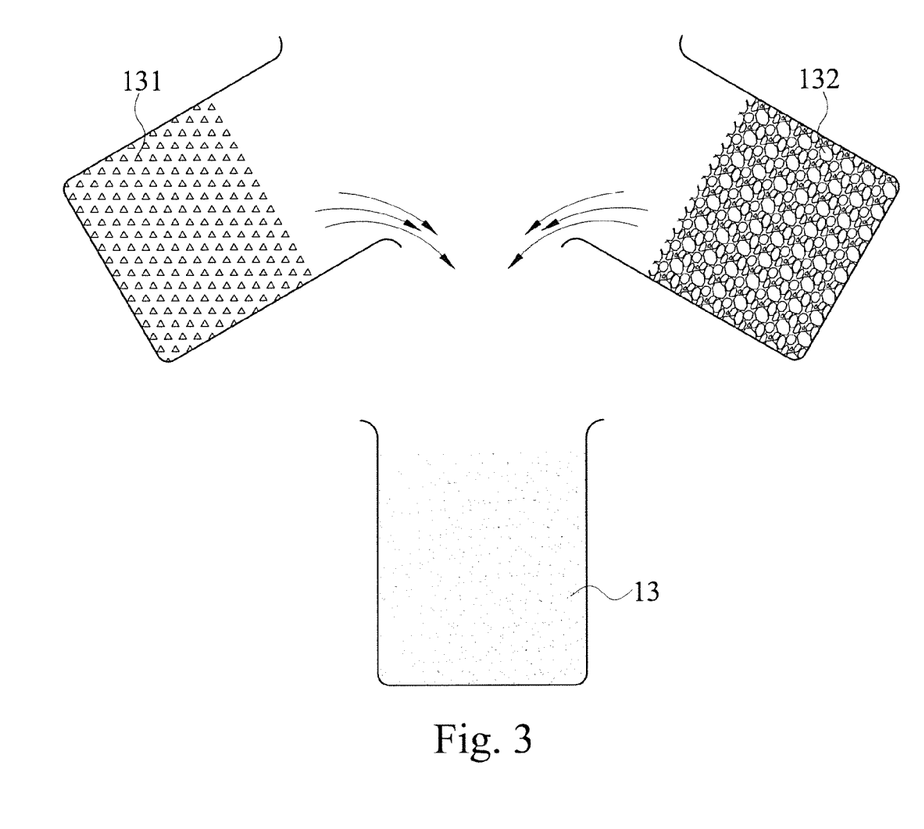
FIG. 3 is a second schematic view of the manufacturing flow in accordance with a first preferred embodiment of the present invention.
Figure 4:
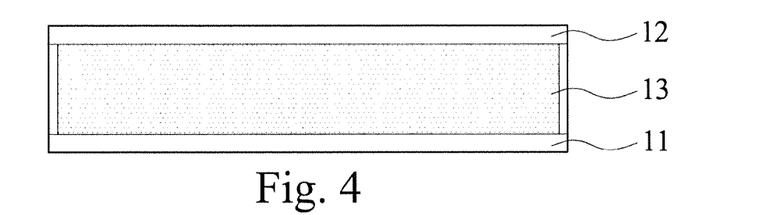
FIG. 4 is a third schematic view of the manufacturing flow in accordance with a first preferred embodiment of the present invention.
Figure 5:
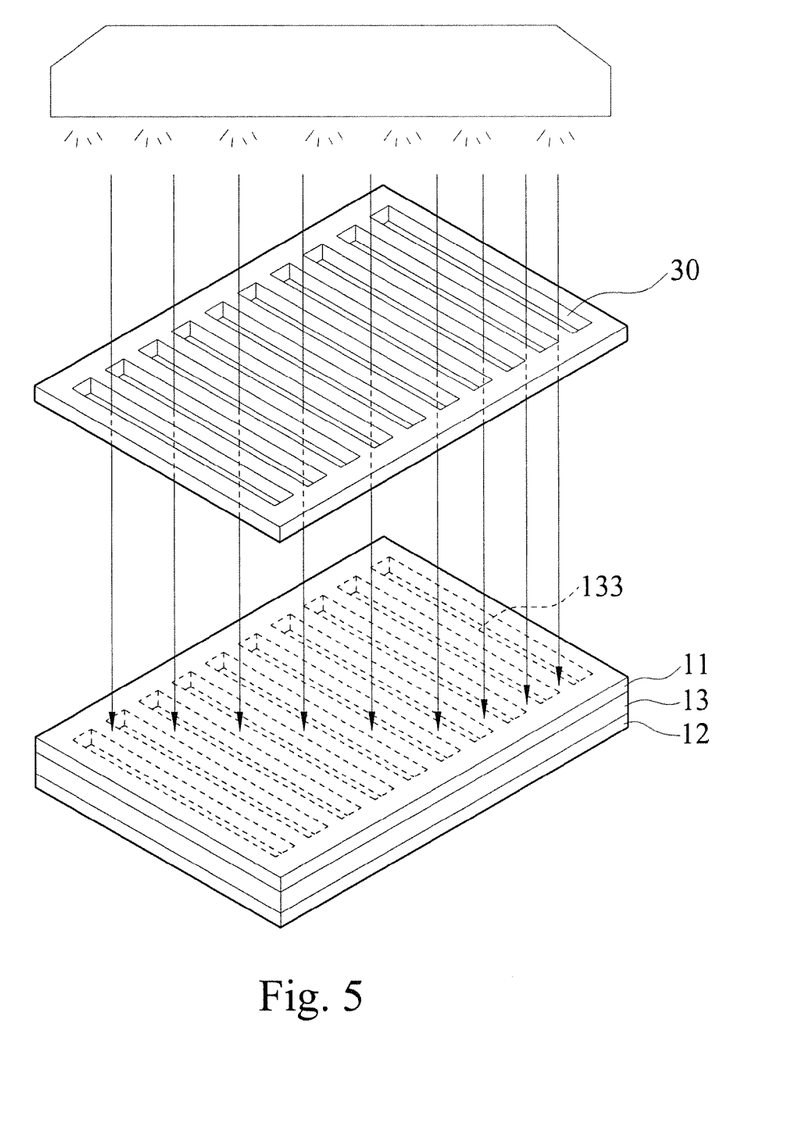
FIG. 5 is a fourth schematic view of the manufacturing flow in accordance with a first preferred embodiment of the present invention.
Figure 6:
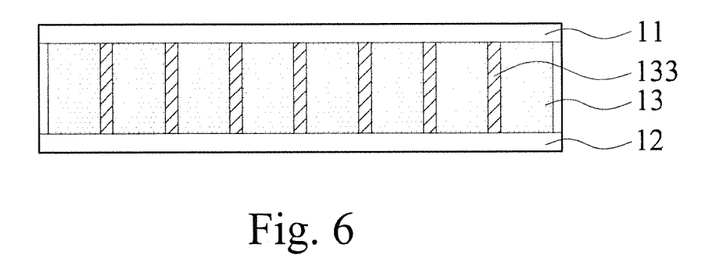
FIG. 6 is a fifth schematic view of the manufacturing flow in accordance with a first preferred embodiment of the present invention.

With reference to FIGS. 1 to 6 for a manufacturing flow chart and schematic views of a manufacturing method of a 3D display device and a grating device thereof in accordance with a first preferred embodiment of the present invention, the manufacturing method comprises the steps of:

(S11) providing a photopolymerization polymer solution 131, an electrochromic solution 132, a first transparent conductive substrate 11 and a second transparent conductive substrate 12 (as shown in FIG. 2);

(S12) mixing a specific quantity X of the photopolymerization polymer solution 131 with a specific quantity Y of the electrochromic solution 132 to produce a grating manufacturing solution 13 (as shown in FIG. 3);

(S13) packaging the grating manufacturing solution 13 between the first transparent conductive substrate 11 and the second transparent conductive substrate 12, to prevent a leakage of the grating manufacturing solution 13 (as shown in FIG. 4);

(S14) projecting a light through a photomask 30 to the grating manufacturing solution 13, such that the grating manufacturing solution 13 projected by the light is cured to form a transparent fence-shaped isolating element 133, and a portion of the grating manufacturing solution 13 blocked by the photomask 30 remains its original fluid state, so as to form a grating device 10 (as shown in FIG. 5); and (S15) installing the grating device 10 at a side of a display device 20, and electrically coupling the first transparent conductive substrate 11 and the second transparent conductive substrate 12 with an electrode portion 14, such that after an electric power is passed through, bright and dark grating effect occur between these grating manufacturing solution 13 and the fence-shaped isolating element 133, so as to produce a grating device 10 of a 3D display device (as shown in FIG. 6).

Figure 7:
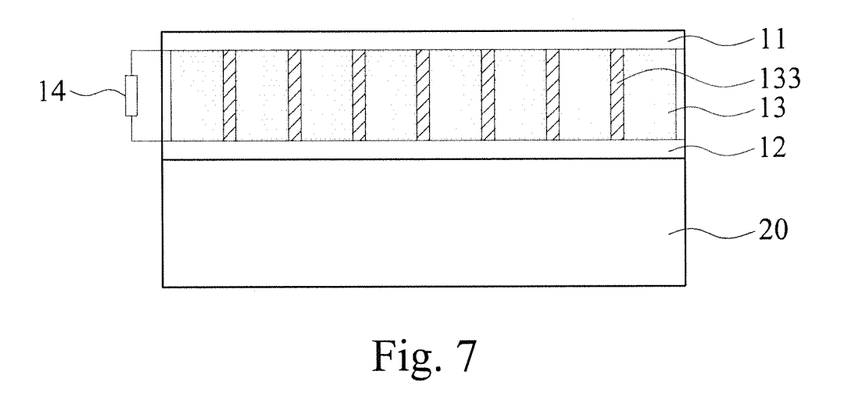
FIG. 7 is a schematic view of an assembly in accordance with a first preferred embodiment of the present invention.
Figure 8:
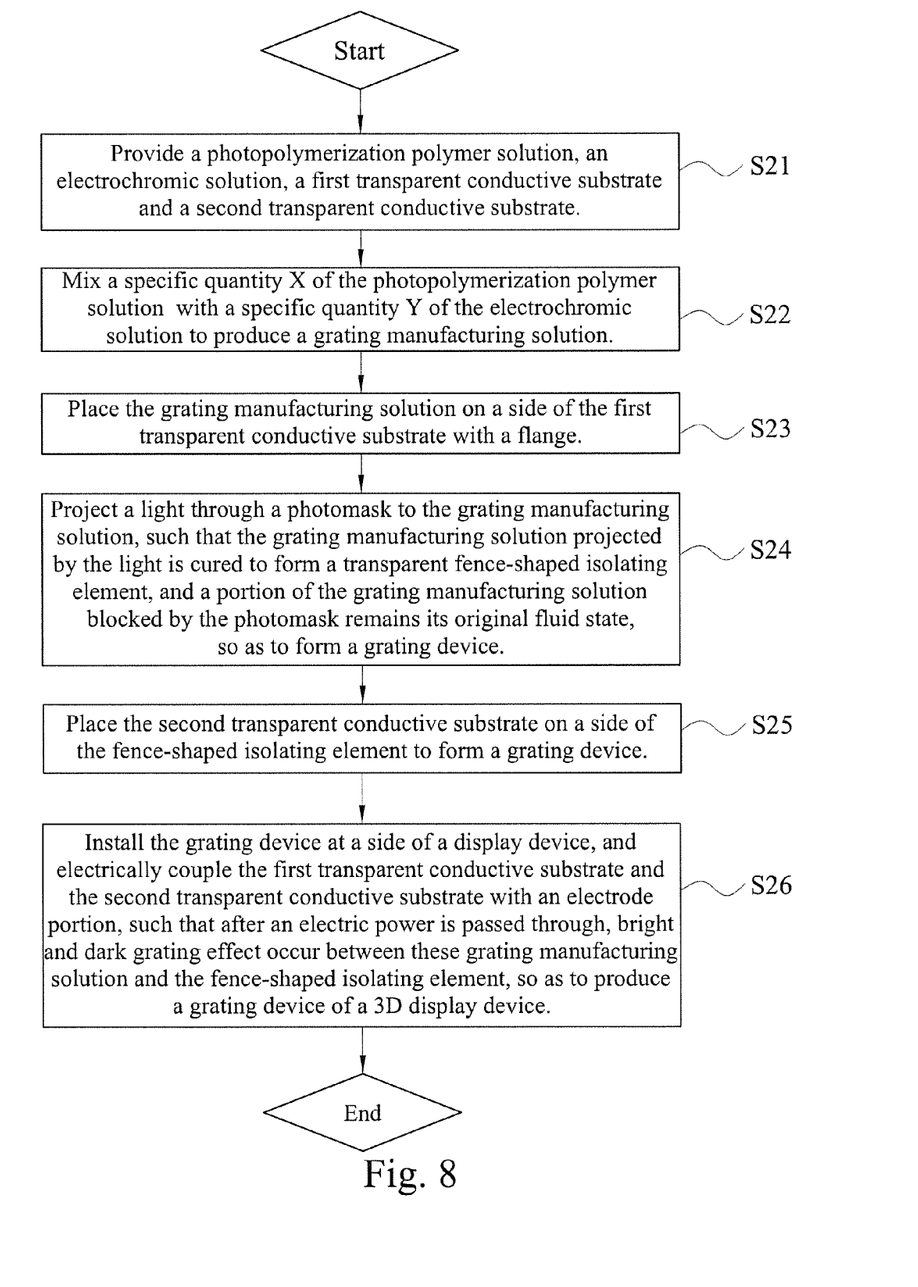
FIG. 8 is a manufacturing flow chart of a second preferred embodiment of the present invention.

With reference to FIG. 7 for a schematic view of an assembly in accordance with a first preferred embodiment of the present invention together with FIGS. 2 to 6, the grating device 10 of the 3D display device of the present invention is installed at a side of a display device 20, and the grating device 10 comprises a first transparent conductive substrate 11, a second transparent conductive substrate 12, a grating manufacturing solution 13 and a fence-shaped isolating element 133 manufactured by the aforementioned method, wherein the first transparent conductive substrate 11 and the second transparent conductive substrate 12 are respectively and electrically coupled to an electrode portion 14, such that after an electric power is passed through the first transparent conductive substrate 11 and the second transparent conductive substrate 12, a voltage difference is produced between the first transparent conductive substrate 11 and the second transparent conductive substrate 12, and electrons are supplied to the electrochromic solution 132 in the grating manufacturing solution 13 by the first transparent conductive substrate 11 and the second transparent conductive substrate 12 to change the valence of ions of the electrochromic solution 132 to change its color to block the light and allow the light to pass through when it is situated at the position of the fence-shaped isolating element 133. If it is necessary to display 2D images and turn off the grating device 10, then the electrode portion 14 is loaded or applied with a reverse voltage to decolor the electrochromic solution 132 back to its transparent state.

The manufacturing method of the invention has the following advantage. The grating manufacturing solution 13 prepared by the photopolymerization polymer solution 131 and the electrochromic solution 132 is packaged between the first transparent conductive substrate 11 and the second transparent conductive substrate 12, and a light is projected to complete the production of the grating device 10, and thus the manufacturing process can be simplified, and the manufacturing efficiency can be improved significantly.

In addition, when the photopolymerization polymer solution 131 and the electrochromic solution 132 of the present invention are prepared, a dilute solution (not shown in the figure) is provided for diluting the grating manufacturing solution 13 to a desired concentration, wherein and alcohol is generally used as the dilute solution.

Figure 9:
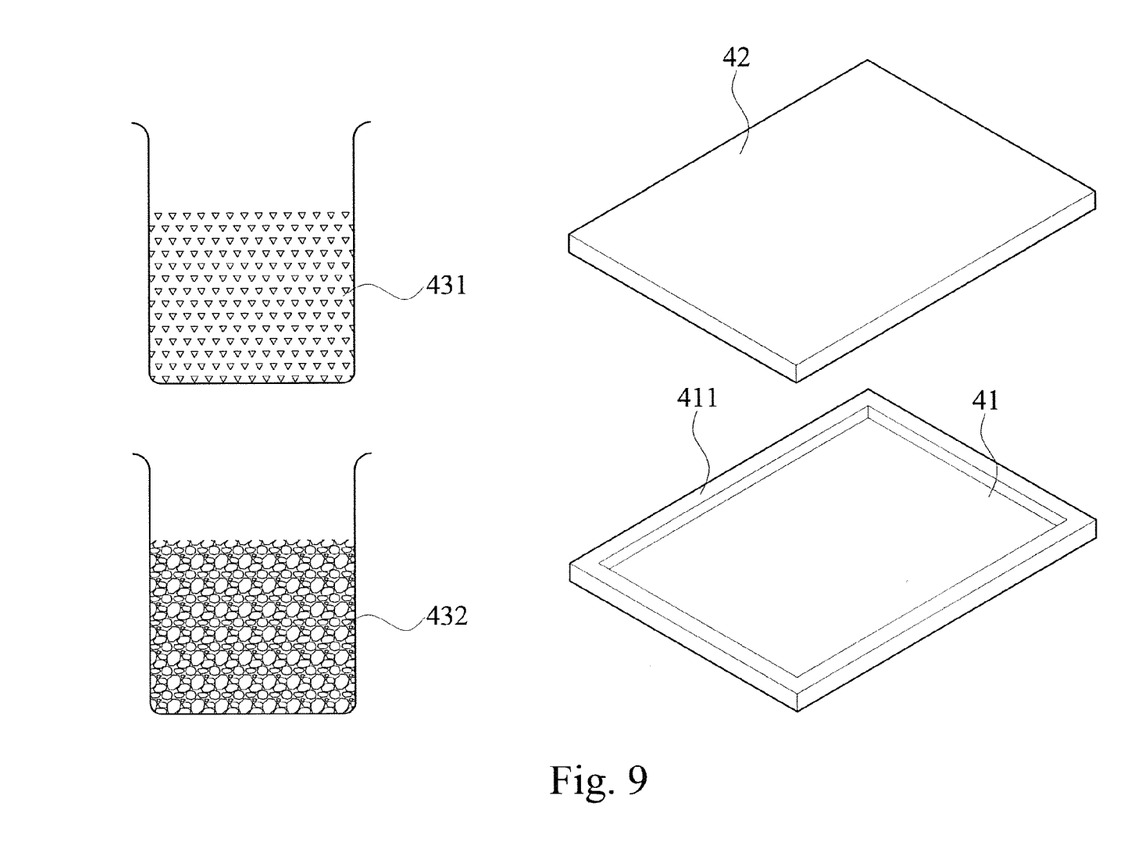
FIG. 9 is a first schematic view of the manufacturing flow in accordance with a second preferred embodiment of the present invention.
Figure 10:
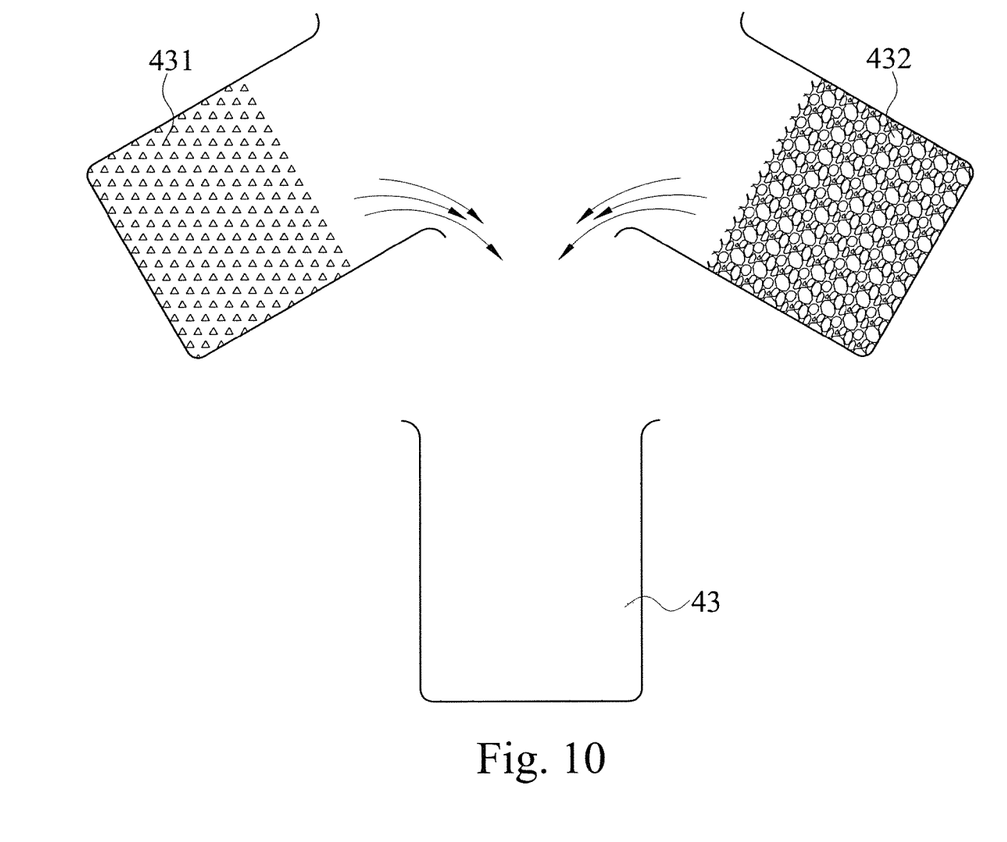
FIG. 10 is a second schematic view of the manufacturing flow in accordance with a second preferred embodiment of the present invention.
Figure 11:
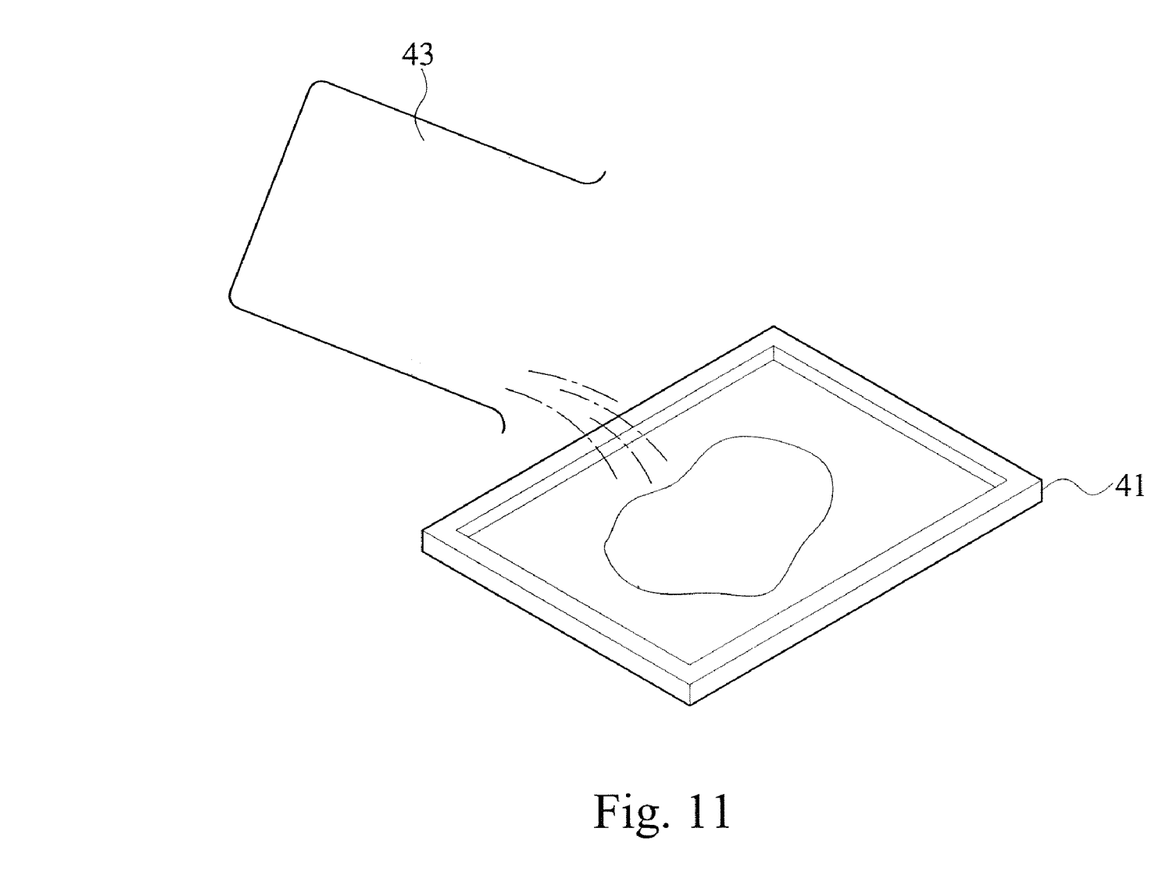
FIG. 11 is a third schematic view of the manufacturing flow in accordance with a second preferred embodiment of the present invention.
Figure 12:
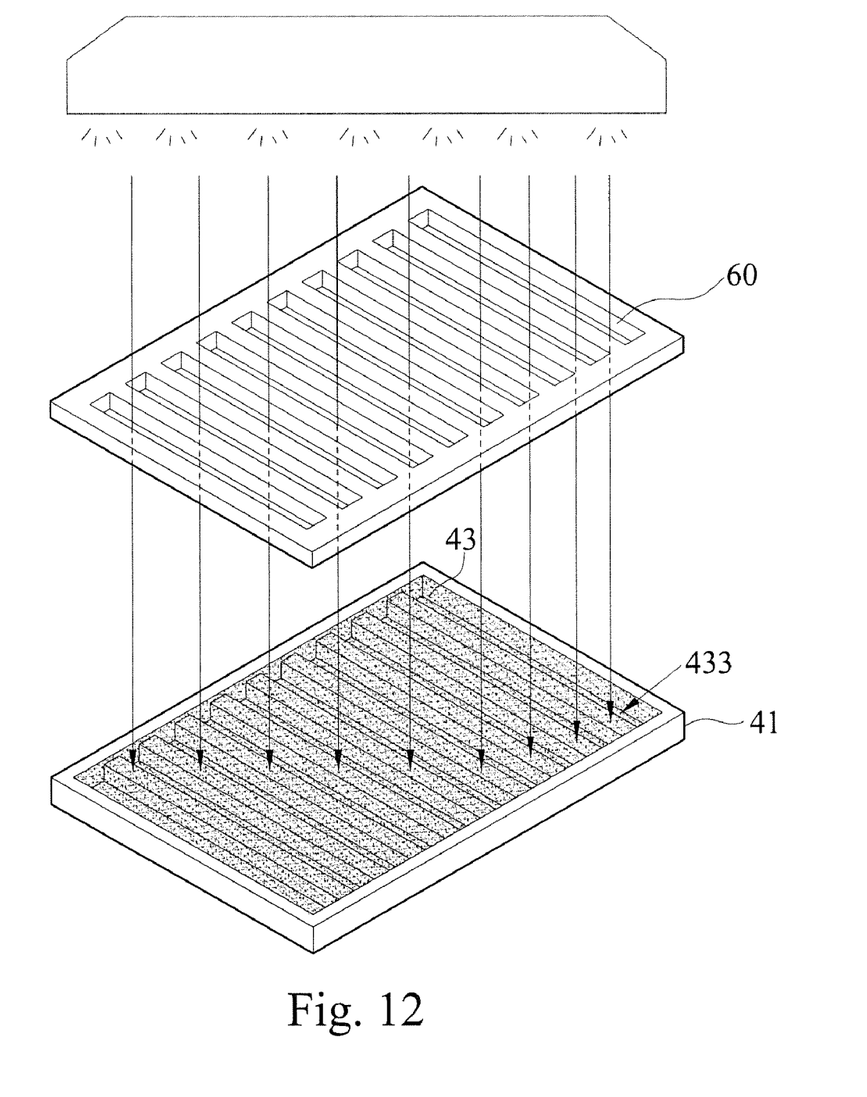
FIG. 12 is a fourth schematic view of the manufacturing flow in accordance with a second preferred embodiment of the present invention.

With reference to FIGS. 8 to 12 for a manufacturing flow chart and schematic views of for a manufacturing flow chart and schematic views of a manufacturing method of a 3D display device and a grating device thereof in accordance with a second preferred embodiment of the present invention, the manufacturing method comprises the steps of:

(S21) providing a photopolymerization polymer solution 431, an electrochromic solution 432, a first transparent conductive substrate 41 with a flange 411, and a second transparent conductive substrate 42 (as shown in FIG. 9);

(S22) mixing a specific quantity X of the photopolymerization polymer solution 431 with a specific quantity Y of the electrochromic solution 432 to produce a grating manufacturing solution 43 (as shown in FIG. 10);

(S23) placing the grating manufacturing solution 43 at a side of the first transparent conductive substrate 41 with the flange 411 (as shown in FIG. 11);

(S24) projecting a light through a photomask 60 to the grating manufacturing solution 43, such that the grating manufacturing solution 43 projected by the light is cured to form a transparent fence-shaped isolating element 433, and a portion of the grating manufacturing solution 43 blocked by the photomask 60 remains its original fluid state (as shown in FIG. 12); and (S25) placing the second transparent conductive substrate 42 on a side of the fence-shaped isolating element 433 to form a grating device 40; and (S26) installing the grating device 40 at a side of a display device 50, and electrically coupling the first transparent conductive substrate 41 and the second transparent conductive substrate 42 with an electrode portion 44, such that after an electric power is passed through, bright and dark grating effect occur between these grating manufacturing solution 43 and the fence-shaped isolating element 433, so as to produce a grating device 40 of a 3D display device.

Figure 13:
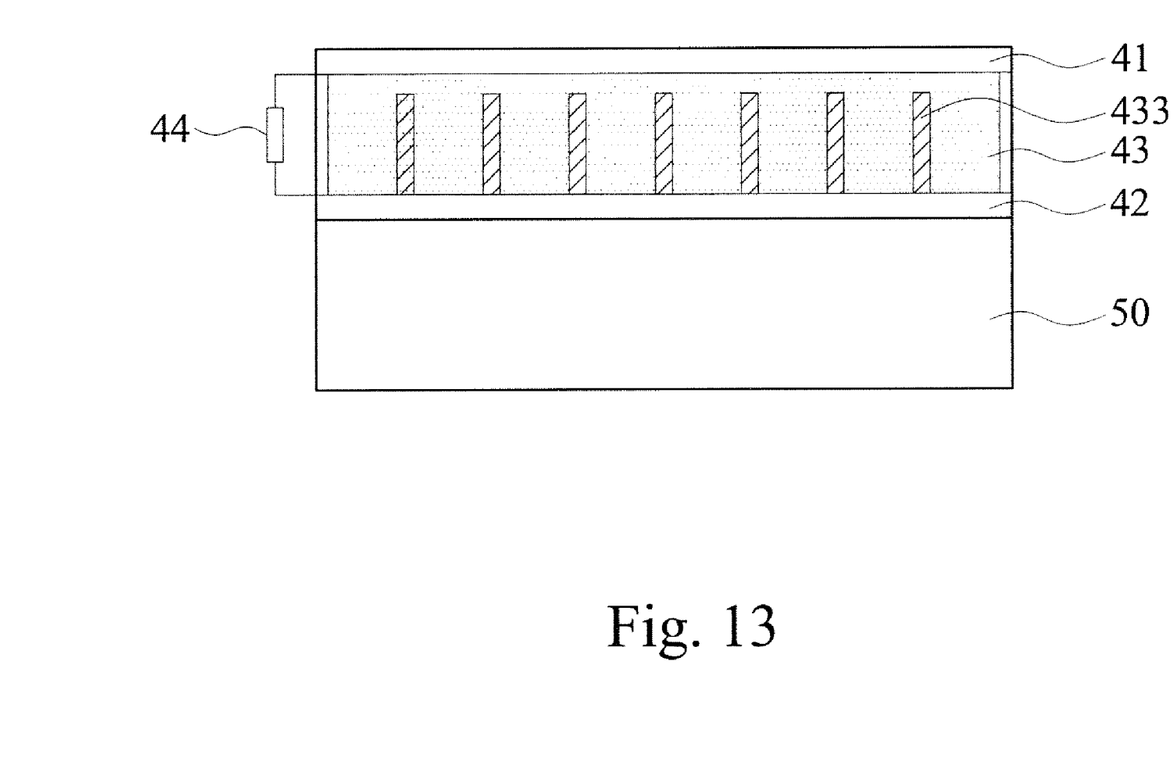
FIG. 13 is a top view of a second preferred embodiment of the present invention.

Compared with the first preferred embodiment of the present invention, the grating manufacturing solution 43 of the second preferred embodiment is placed in the first transparent conductive substrate 41 with the flange 411, but the light projection process is performed first before the grating manufacturing solution 43 is packaged. After the fence-shaped isolating element 433 is formed (as shown in FIG. 13), the second transparent conductive substrate 42 is covered onto the fence-shaped isolating element 43 for the packaging process to complete the production of the grating device 40.

Wherein, the first transparent conductive substrates 11, 41 and the second transparent conductive substrates 12, 42 are made of a plastic, polymer plastic or glass material, or a plastic polymer selected from the collection of resin, polyethylene terephthalate (PET), polycarbonate (PC), polyethylene (PE), polyvinyl chloride (PVC), polypropylene (PP), polystyrene (PS), and polymethylmethacrylate (PMMA), and the first transparent conductive substrate 11, 41 and the second transparent conductive substrate 12, 42 are uniformly coated with an electrically conductive material selected from the collection of indium tin oxide (ITO), indium zinc oxide (IZO), aluminum-doped ZnO (AZO) and antimony tin oxide (ATO), carbon nanotube, poly-3,4-ethylenedioxythiophene (PEDOT) and polyaniline, and the first transparent conductive substrates 11, 41 and the second transparent conductive substrates 12, 42 are electrically and respectively coupled to electrode portions 14, 44, such that the electrode portions 14, 44 can be control to modulate the voltage value between the first transparent conductive substrates 11, 41 and the second transparent conductive substrates 12, 42. In the second preferred embodiment, a flange 411 is formed at edges around the first transparent conductive substrate 41 to form an enclosed frame shaped structure for containing the grating manufacturing solution 43.

The photopolymer is also known as photopolymerized sol-gel (PSG) made of a copolymer based material added with a specific activated dilute monomer, a photoinitiator and a plurality of additives, and the photoinitiator in the liquid materials is excited by the projection of ultraviolet light to become free radicals or cations to induce a chemical reaction between unsaturated double-bond substances in the materials to form a solid structure, wherein the photopolymerized polymer solution 131, 431 of the present invention can be of a free-radical polymerization type or an ionic polymerization type. If the photopolymerized polymer solution 131, 431 is of the free-radical polymerization type, the photopolymerized polymer solution 131, 431 is one selected from the collection of acrylate and unsaturated polyester. If the photopolymerized polymer solution 131, 431 is of the ionic polymerization type, the photopolymerized polymer solution 131, 431 is made of epoxy resin.

In a preferred embodiment, the photopolymerization polymer solution 131, 431 can be Norland Optical Adhesive 65 (NOA-65) which is a mixed solution containing 5 wt % of benzophenone photoinitiator, trimethylol-propane diallyl ether, trimethylolpropane tristhiol and isophorone diisocyanate ester. If the benzophenone photoinitiator is projected with a ultraviolet light of a specific wavelength to reach an excited state, the molecules of the photoinitiator are decomposed or hydrogen is transferred to produce free radicals, and these free radicals induces olefinic bonds in the propylene ether to produce new free radicals, such that the whole system will produce a free radical chain polymerization to cure the solution into a transparent solid.

The electrochromic solution 132, 432 of the present invention is made by mixing and dissolving an inorganic electrochromic material and an organic electrochromic material into a solvent, wherein the inorganic electrochromic material is an inorganic derivative selected from the collection of an oxide, a sulfide, a chloride and a hydroxide of a transition element, and the transition element is one selected from the collection of a scandium subgroup (IIIB), a vanadium subgroup (VB), a chromium subgroup (VIB), a manganese subgroup (VIIB), an iron series (VIII), a copper subgroup (IB), a zinc subgroup (IIB), and a platinum series (VIIIB) of fifth and sixth periods), and the inorganic electrochromic material is an inorganic derivative selected from the collection of an oxide, a sulfide, a chloride, and a hydroxide of a halogen group (VIIA), an oxygen group (VIA), a nitrogen group (VA), a carbon group (IVA), a boron group (IIIA), an alkaline earth metal group (IIA), and an alkaline metal group (IA). Alternately, the inorganic electrochromic material is one selected from the collection of ferrous chloride ($FeCl_2$), ferric trichloride ($FeCl_3$), titanium trichloride ($TiCl_3$), titanium tetrachloride ($TiCl_4$), bismuth chloride ($BiCl_3$), copper chloride ($CuCl_2$) and lithium bromide (LiBr). In the present invention, the organic electrochromic material is one selected from the collection of a redox indicator, a pH indicator and an organic compound. If the organic electrochromic material is a redox indicator, the redox indicator is one selected from the collection of methylene blue ($C_{16}H_{18}ClN_3S.3H_2O$), methyl viologen, N-phenyl-o-anthranilic acid ($C_{13}H_{11}NO_2$), sodium diphenylamine sulfonate ($C_{12}H_{10}NNaO_3S$), dichloroindophenol sodium ($C_{12}H_6C_{12}NNaO_2$), and N—N'-diphenylbenzidine ($C_{20}H_{20}N_2$). The viologen has different colors due to the length of carbon chain of the R substitute radical or different structures, and the R substitute radical can be methyl, ethyl, propyl, butyl, pentyl, hexyl, heptyl, octyl, iso-pentyl, or benzyl radical, and the viologen of a preferred embodiment is one selected from the collection of 1,1'-dimethyl-4,4'-bipyridinium dichloride hydrate (MV), 1,1'-diheptyl-4,4'-bipyridinium dibromide (HV), 1,1'-dibenzyl-4,4'-bipyridinium dichloride hydrate (BV), 1,1'-bis(2,4-dinitrophenyl)-4,4'-bipyridinium dichloride, 1,1'-di-n-octyl-4,4'-bipyridinium dibromide, octyl, 1,1'-diphenyl-4,4'-bipyridinium dichloride and 4,4'-bipyridyl. If the organic electrochromic material is a pH indicator, the pH indicator is variamine blue B diazonium salt ($C_{13}H_{12}ClN_3O$). If the organic electrochromic material is an organic compound, the organic compound is one selected from the collection of ferrocene [$Fe(C_5H_5)_2$] and 7,7,8,8-tetracyanoquinodimethane.

The solvent of the electrochromic solution 132, 432 is made of a material selected from the collection of dimethyl sulfoxide [$(CH_3)_2SO$], propylene carbonate ($C_4H_6O_3$), water ($H_2O$), γ-butyrolactone, acetonitrile, propionitrile, benzonitrile, glutaronitrile, methylglutaronitrile, 3,3'-oxy-2-propionitrile, hydroxyl propionitrile, dimethyl-formamide, N-methylpyrrolidone, sulfolane, 3-methyl sulfolane and their mixtures.

The electrochromic solution 132, 432 further includes at least one inert conductive salt selected from the collection of a lithium salt, a sodium salt, and a tetraalkylammonium salt.

In summation of the description above, the manufacturing methods in accordance with the first and second preferred embodiments of the present invention can simplify and expedite the manufacturing procedure to improve the manufacturing efficiency. In addition, the position of installing the fence-shaped isolating element 134 in the structure of the fence-shaped isolating elements 133, 433 of the grating devices 10, 40 in accordance with the present invention can be changed according to the shape of the hole of the photomask 30, 60 such as a fence-shaped hole, a plug-in hole or a slot hole provided for connecting to a side of the display device 20, 50 to achieve the 3D display effect.

While the invention has been described by means of specific embodiments, numerous modifications and variations such as the material, size or shape of the first transparent conductive film and/or the second transparent conductive film or the composition and proportion of solutions for manufacturing the grating could be made thereto by those generally skilled in the art without departing from the scope and spirit of the invention set forth in the claims.

What is claimed is:

1. A manufacturing method of a 3D display device and a grating device thereof, comprising the steps of:
    providing a photopolymerization polymer solution, an electrochromic solution, a first transparent conductive substrate and a second transparent conductive substrate;
    mixing a specific quantity X of the photopolymerization polymer solution with a specific quantity Y of the electrochromic solution to produce a grating manufacturing solution;
    packaging the grating manufacturing solution between the first transparent conductive substrate and the second transparent conductive substrate;
    projecting a light through a photomask to the grating manufacturing solution, such that the grating manufacturing solution projected by the light is polymerized and cured to form a transparent fence-shaped isolating element, and the grating manufacturing solution masked by the photomask remains its original fluid state to produce a grating device; and
    installing the grating device on a side of a display device, and electrically coupling the first and second transparent conductive substrates to an electrode portion, such that a bright/dark grating effect is produced between the grating manufacturing solution and the isolating element after an electric power is passed through, so as to produce the grating device of the 3D display device.

2. The manufacturing method of a 3D display device and a grating device thereof as recited in claim 1, wherein the photopolymerization polymer solution is one selected from the collection of a free-radical polymerization type and an ionic polymerization type.

3. The manufacturing method of a 3D display device and a grating device thereof as recited in claim 2, wherein the photopolymerization polymer solution of the free-radical polymerization type is one selected from the collection of acrylate and unsaturated polyester.

4. The manufacturing method of a 3D display device and a grating device thereof as recited in claim 2, wherein the photopolymerization polymer solution of the ionic polymerization type is epoxy resin.

5. The manufacturing method of a 3D display device and a grating device thereof as recited in claim 1, wherein the photopolymerization polymer solution is NOA-65.

6. The manufacturing method of a 3D display device and a grating device thereof as recited in claim 1, wherein the electrochromic solution is made by mixing and dissolving an inorganic electrochromic material and an organic electrochromic material into a solvent.

7. The manufacturing method of a 3D display device and a grating device thereof as recited in claim 6, wherein the inorganic electrochromic material is an inorganic derivative selected from the collection of an oxide, a sulfide, a chloride and a hydroxide of a transition element.

8. The manufacturing method of a 3D display device and a grating device thereof as recited in claim 7, wherein the transition element is one selected from the collection of a scandium subgroup (IIIB), a vanadium subgroup (VB), a titanium subgroup (IVB), a chromium subgroup (VIB), a manganese subgroup (VIIB), an iron series (VIII), a copper subgroup (IB), a zinc subgroup (JIB), and a platinum series (VIIIB).

9. The manufacturing method of a 3D display device and a grating device thereof as recited in claim 6, wherein the inorganic electrochromic material is an inorganic derivative selected from the collection of an oxide, a sulfide, a chloride, and a hydroxide of a halogen group (VIIA), an oxygen group (VIA), a nitrogen group (VA), a carbon group (IVA), a boron group (NIA), an alkaline earth metal group (IIA), and an alkaline metal group (IA).

10. The manufacturing method of a 3D display device and a grating device thereof as recited in claim 6, wherein the inorganic electrochromic material is one selected from the collection of ferrous chloride ($FeCl_2$), ferric trichloride ($FeCl_3$), titanium trichloride ($TiCl_3$), titanium tetrachloride ($TiCl_4$), bismuth chloride ($BiCl_3$), copper chloride ($CuCl_2$) and lithium bromide (LiBr).

11. The manufacturing method of a 3D display device and a grating device thereof as recited in claim 6, wherein the organic electrochromic material is one selected from the collection of a redox indicator, a pH indicator and an organic compound.

12. The manufacturing method of a 3D display device and a grating device thereof as recited in claim 11, wherein the redox indicator is one selected from the collection of methylene blue ($C_{16}H_{18}ClN_3S.3H_2O$), methyl viologen, N-phenyl-o-anthranilic acid ($C_{13}H_{11}NO_2$), sodium diphenylamine sulfonate ($C_{12}H_{10}NNaO_3S$), dichloroindophenol sodium ($C_{12}H_6C_{12}NNaO_2$), and N—N'-diphenylbenzidine ($C_{20}H_{20}N_2$).

13. The manufacturing method of a 3D display device and a grating device thereof as recited in claim 11, wherein the pH indicator is variamine blue B diazonium salt ($C_{13}H_{12}ClN_3O$).

14. The manufacturing method of a 3D display device and a grating device thereof as recited in claim 11, wherein the organic compound is one selected from the collection of 7,7,8,8-tetracyanoquinodimethane and ferrocene ($Fe(C_5H_5)_2$).

15. The manufacturing method of a 3D display device and a grating device thereof as recited in claim 6, wherein the solvent is one selected from the collection of dimethyl sulfoxide [$(CH_3)_2SO$], propylene carbonate ($C_4H_6O_3$), water ($H_2O$), γ-butyrolactone, acetonitrile, propionitrile, benzonitrile, glutaronitrile, methylglutaronitrile, 3,3'-oxy-2-propionitrile, hydroxyl propionitrile, dimethyl-formamide, N-methylpyrrolidone, sulfolane, 3-methyl sulfolane and their mixtures.

16. The manufacturing method of a 3D display device and a grating device thereof as recited in claim 1, wherein the electrochromic solution further includes at least one inert conductive salt.

17. The manufacturing method of a 3D display device and a grating device thereof as recited in claim 16, wherein the inert conductive salt is one selected from the collection of a lithium salt, a sodium salt, and a tetraalkylammonium salt.

18. The manufacturing method of a 3D display device and a grating device thereof as recited in claim 1, wherein the grating manufacturing solution is further mixed with a dilute solution.

19. The manufacturing method of a 3D display device and a grating device thereof as recited in claim 18, wherein the dilute solution is an alcohol.

20. A manufacturing method of a 3D display device and a grating device thereof, comprising the steps of:
providing a photopolymerization polymer solution, an electrochromic solution, a first transparent conductive substrate with a flange and a second transparent conductive substrate;
mixing a specific quantity X of the photopolymerization polymer solution with a specific quantity Y of the electrochromic solution to produce a grating manufacturing solution;
placing the grating manufacturing solution on a side of the first transparent conductive substrate with the flange;
projecting a light through a photomask to the grating manufacturing solution, such that the projected grating manufacturing solution is polymerized and cured to form a transparent a fence-shaped isolating element, and the grating manufacturing solution blocked by the photomask remains its original fluid state;
placing the second transparent conductive substrate at a side of the fence-shaped isolating element to form a grating device; and
placing the grating device at a side of a display device, and the first transparent conductive substrate and the second transparent conductive substrate being electrically coupled to an electrode portion, such that after an electric power is passed through, bright and dark grating effects occur between the grating manufacturing solution and the isolating element, so as to produce the grating device of the 3D display device.

21. The manufacturing method of a 3D display device and a grating device thereof as recited in claim 20, wherein the photopolymerization polymer solution is one selected from the collection of a free-radical polymerization type and an ionic polymerization type.

22. The manufacturing method of a 3D display device and a grating device thereof as recited in claim 21, wherein the photopolymerization polymer solution of the free-radical polymerization type is one selected from the collection of acrylate and unsaturated polyester.

23. The manufacturing method of a 3D display device and a grating device thereof as recited in claim 21, wherein the ionic polymerization type photopolymerization polymer solution is epoxy resin.

24. The manufacturing method of a 3D display device and a grating device thereof as recited in claim 20, wherein the photopolymerization polymer solution is NOA-65.

25. The manufacturing method of a 3D display device and a grating device thereof as recited in claim 20, wherein the electrochromic solution is made by mixing and dissolving an inorganic electrochromic material and an organic electrochromic material into a solvent.

26. The manufacturing method of a 3D display device and a grating device thereof as recited in claim 25, wherein the inorganic electrochromic material is an inorganic derivative selected from the collection of an oxide, a sulfide, a chloride and a hydroxide of a transition element.

27. The manufacturing method of a 3D display device and a grating device thereof as recited in claim 26, wherein the transition element is one selected from the collection of a scandium subgroup (IIIB), a vanadium subgroup (VB), a titanium subgroup (IVB), a chromium subgroup (VIB), a manganese subgroup (VIIB), an iron series (VIII), a copper subgroup (IB), a zinc subgroup (IIB), and a platinum series (VIIIB).

28. The manufacturing method of a 3D display device and a grating device thereof as recited in claim 25, wherein the inorganic electrochromic material is an inorganic derivative selected from the collection of an oxide, a sulfide, a chloride, and a hydroxide of a halogen group (VITA), an oxygen group (VIA), a nitrogen group (VA), a carbon group (IVA), a boron group (IIIA), an alkaline earth metal group (IIA), and an alkaline metal group (IA).

29. The manufacturing method of a 3D display device and a grating device thereof as recited in claim 25, wherein the inorganic electrochromic material is one selected from the collection of ferrous chloride ($FeCl_2$), ferric trichloride ($FeCl_3$), titanium trichloride ($TiCl_3$), titanium tetrachloride ($TiCl_4$), bismuth chloride ($BiCl_3$), copper chloride ($CuCl_2$) and lithium bromide (LiBr).

30. The manufacturing method of a 3D display device and a grating device thereof as recited in claim 25, wherein the organic electrochromic material is one selected from the collection of a redox indicator, a pH indicator and an organic compound.

31. The manufacturing method of a 3D display device and a grating device thereof as recited in claim 30, wherein the redox indicator is one selected from the collection of methylene blue ($C_{16}H_{18}ClN_3S.3H_2O$), methyl viologen, N-phenyl-o-anthranilic acid ($C_{13}H_{11}NO_2$), sodium diphenylamine sulfonate ($C_{12}H_{10}NNaO_3S$), dichloroindophenol sodium ($C_{12}H_6C_{12}NNaO_2$), and N—N'-diphenylbenzidine ($C_{20}H_{20}N_2$).

32. The manufacturing method of a 3D display device and a grating device thereof as recited in claim 30, wherein the pH indicator is variamine blue B diazonium salt ($C_{13}H_{12}ClN_3O$).

33. The manufacturing method of a 3D display device and a grating device thereof as recited in claim 30, wherein the organic compound is one selected from the collection of 7,7,8,8-tetracyanoquinodimethane and ferrocene [$Fe(C_5H_5)_2$].

34. The manufacturing method of a 3D display device and a grating device thereof as recited in claim 25, wherein the solvent is one selected from the collection of dimethyl sulfoxide [$(CH_3)_2SO$], propylene carbonate ($C_4H_6O_3$), water ($H_2O$), γ-butyrolactone, acetonitrile, propionitrile, benzonitrile, glutaronitrile, methylglutaronitrile, 3,3'-oxy-2-propionitrile, hydroxyl propionitrile, dimethyl-formamide, N-methylpyrrolidone, sulfon, 3-methyl sulfone and their mixtures.

35. The manufacturing method of a 3D display device and a grating device thereof as recited in claim 20, wherein the electrochromic solution further includes at least one inert conductive salt.

36. The manufacturing method of a 3D display device and a grating device thereof as recited in claim 35, wherein the inert conductive salt is one selected from the collection of a lithium salt, a sodium salt, and a tetraalkylammonium salt.

37. The manufacturing method of a 3D display device and a grating device thereof as recited in claim 20, wherein the grating manufacturing solution is further mixed with a dilute solution.

38. The manufacturing method of a 3D display device and a grating device thereof as recited in claim 37, wherein the dilute solution is an alcohol.

* * * * *